July 1, 1924.
W. N. EATON
MEASURING INSTRUMENT
Filed Oct. 29, 1920
1,499,861
5 Sheets—Sheet 1
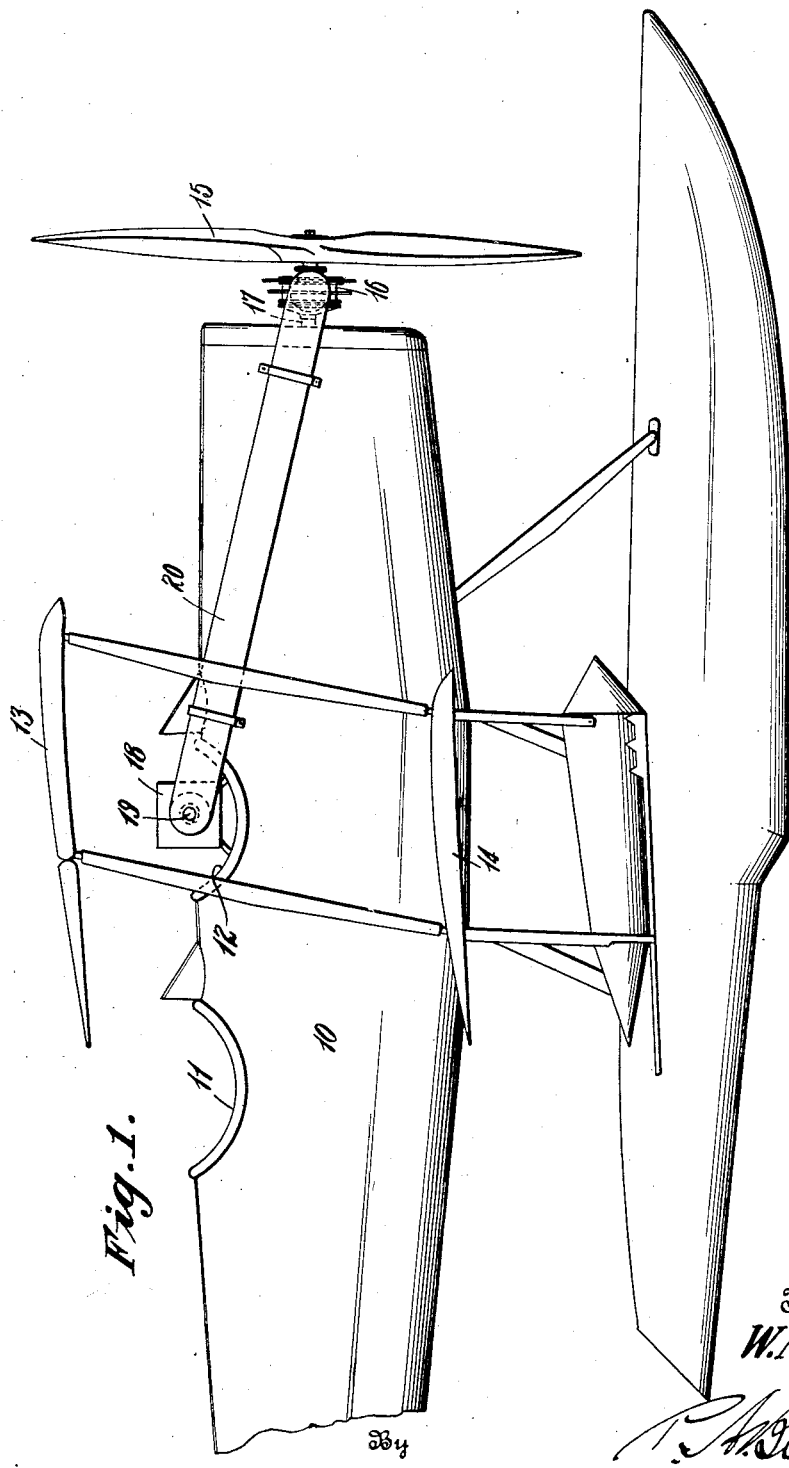
Inventor
W. N. Eaton
By
Attorney July 1, 1924.
W. N. EATON
MEASURING INSTRUMENT
Filed Oct. 29, 1920
1,499,861
5 Sheets-Sheet 2
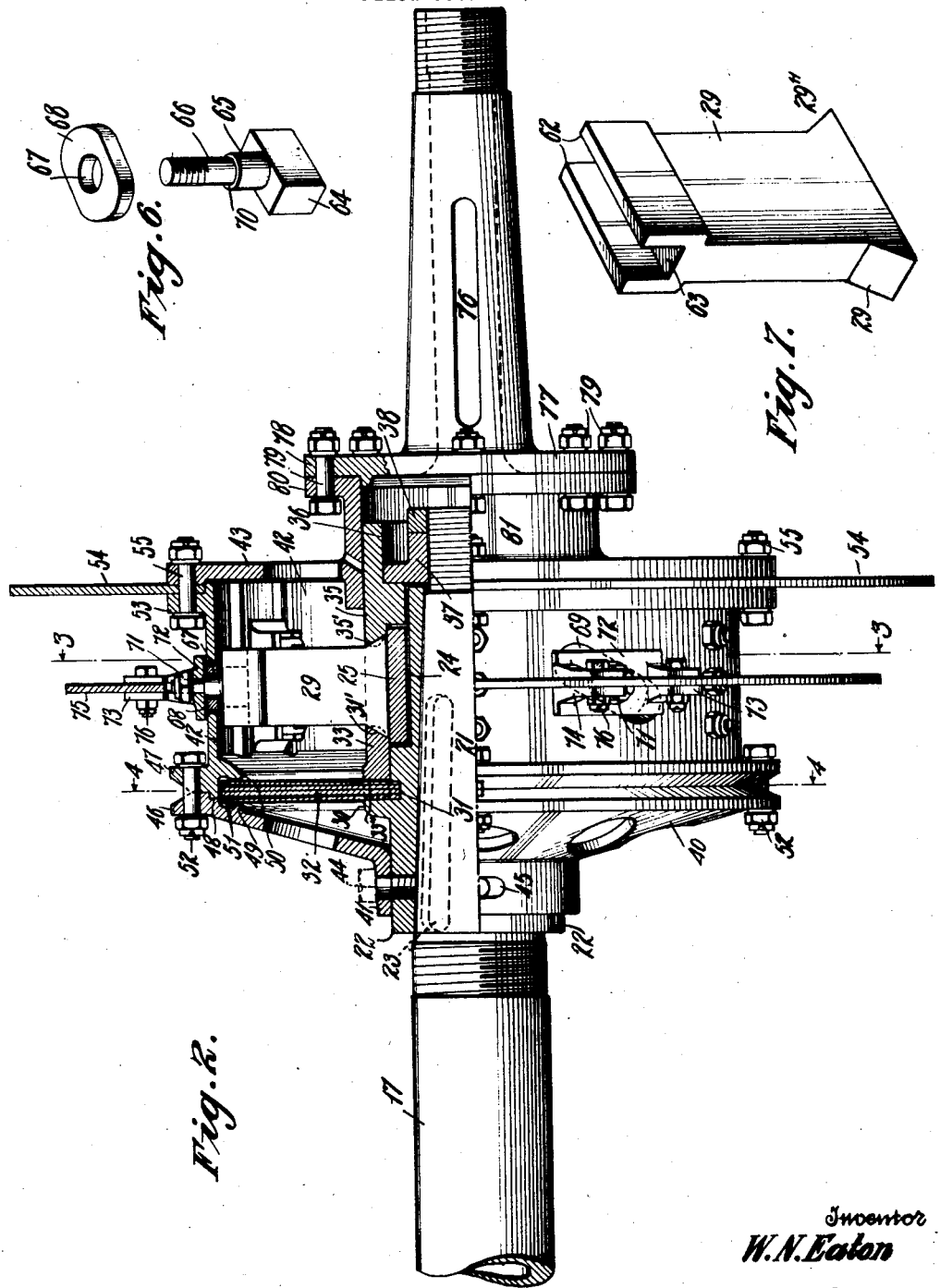
Inventor
W. N. Eaton
By
Attorney July 1, 1924.
W. N. EATON
1,499,861
MEASURING INSTRUMENT
Filed Oct. 29, 1920
5 Sheets-Sheet 3
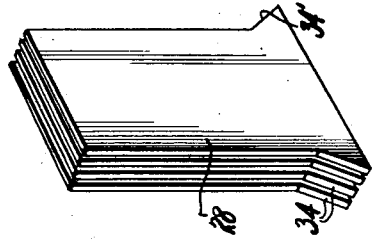
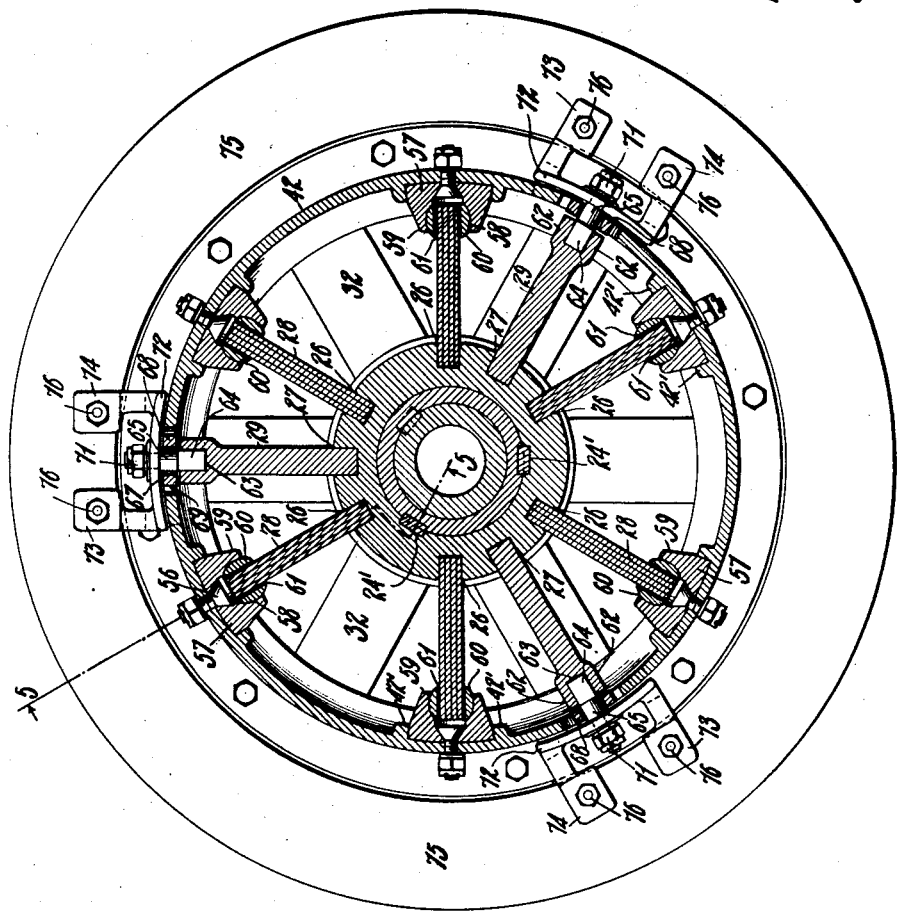
Inventor
W. N. Eaton
By
Attorney July 1, 1924.

W. N. EATON 1,499,861

MEASURING INSTRUMENT

Filed Oct. 29, 1920

Inventor
W. N. Eaton

By
Attorney

July 1, 1924.
W. N. EATON
1,499,861
MEASURING INSTRUMENT
Filed Oct. 29, 1920     5 Sheets-Sheet 5
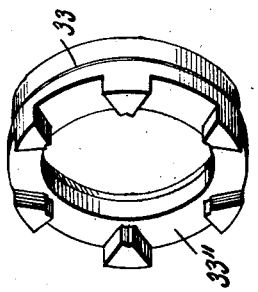
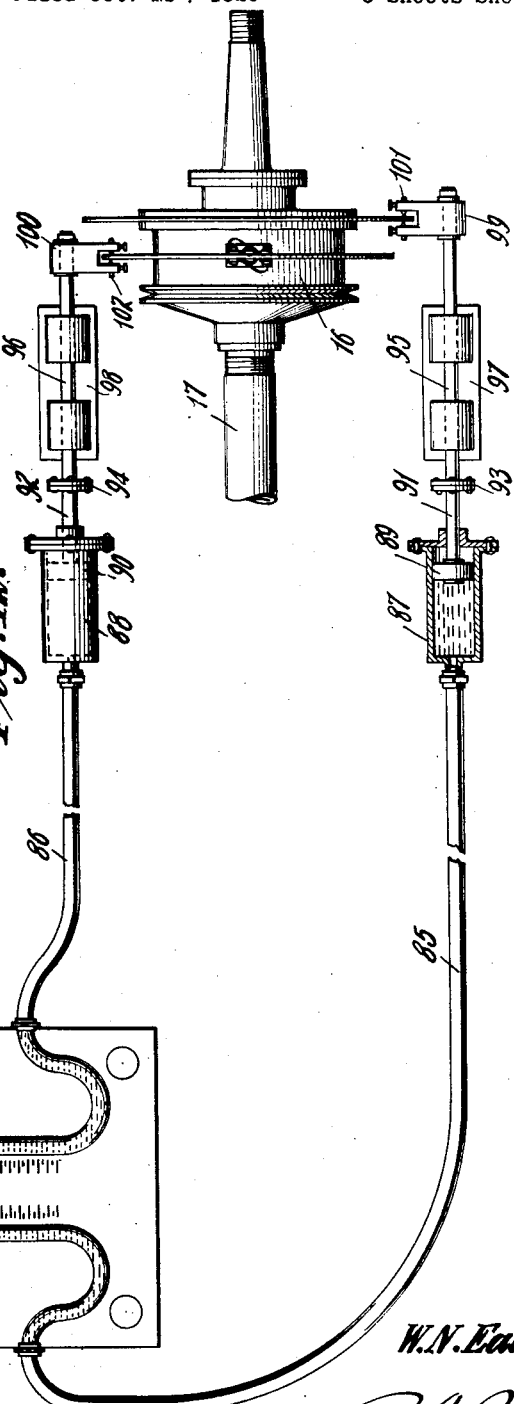
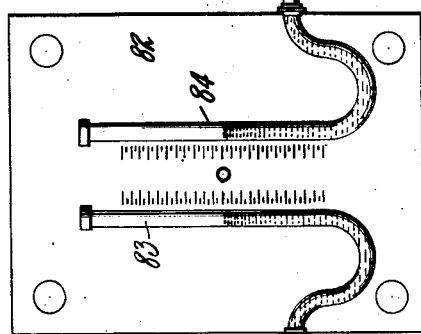
Inventor
W. N. Eaton
By
Attorney Patented July 1, 1924.

1,499,861

UNITED STATES PATENT OFFICE.

WILLIAM N. EATON, OF WASHINGTON, DISTRICT OF COLUMBIA.

MEASURING INSTRUMENT.

Application filed October 29, 1920. Serial No. 420,529.

*To all whom it may concern:*

Be it known that I, WILLIAM N. EATON, a citizen of the United States, residing at Washington, District of Columbia, have invented new and useful Improvements in Measuring Instruments, of which the following is a specification.

This invention relates to an apparatus or mechanical device for simultaneously or independently indicating a plurality of forces such as torque and thrust exerted by revoluble bodies or members at various speeds such as propellers or shafts, and consists in the construction, combination, and adaptation of parts, as will be more specifically hereinafter pointed out.

In brief, the invention consists of an improvement in an indicating transmission apparatus wherein the apparatus is mounted directly on a revoluble member such as an aeroplane engine or other revolving shaft of machine to be tested or attached to a revoluble body such as a propeller in such a manner that the resultant of the work delivered in either case is produced by the action of the apparatus upon indicating mechanism associated with the apparatus all disclosed hereinafter in detail.

Heretofore it has been customary to measure forces, particularly torque and thrust, independently, since these forces have been considered such that the measurement of both forces at the same time has been found to be impractical.

Also various experiments has been made to develop an instrument of this type capable of measuring with accuracy the torque and thrust of propellers without success.

It is therefore one object of this invention to provide an inexpensive and easily constructed apparatus for simultaneously measuring and indicating a plurality of forces.

Another object of the invention is to provide a simple and practical apparatus for indicating simultaneously or independently a plurality of forces.

Another object of the invention is to provide a reliable and efficient apparatus for accurately measuring and indicating, simultaneously or independently, the thrust and torque of aeroplane or other propellers.

Another object of the invention is to provide a compact and self-contained apparatus for measuring, indicating and recording simultaneously or independently, the torque and thrust of all bodies in motion exerting these forces.

A further object of the invention is to provide an apparatus which is simple in operation and construction and which may be readily mounted on any revolving body or member exerting forces to be measured.

Other objects will be hereinafter pointed out or appear obvious from the following description.

The invention accordingly consists in such features of construction, combination of parts and unique relation of the members all as more clearly hereinafter outlined and pointed out in the appended claims.

In order to enable others more skilled in the art to more fully understand the invention, drawings depicting a preferred embodiment thereof have been annexed as part of this disclosure in which, Figure 1 is a side elevation of portions of an aeroplane with my improved apparatus which may be called a dynamometer and indicating mechanism mounted thereon.

Figure 2 is a side elevation, partly in section of the apparatus showing the same mounted on the crankshaft of an engine.

Figure 3 is a vertical sectional view on the line 3—3 of Figure 2.

Figures 6, 7, 8, 9, 10 and 11 are detail perspective views of a T bolt, guide post, spring unit, bearing guide, bearing, and annular ring, respectively, in order to more completely understand the invention and, Figure 12 is a top plan view of the dynamometer mounted on the crank shaft of an aeroplane engine, showing same connected to another form of indicator.

Figure 10:
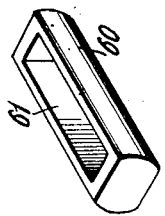
Figure 5:
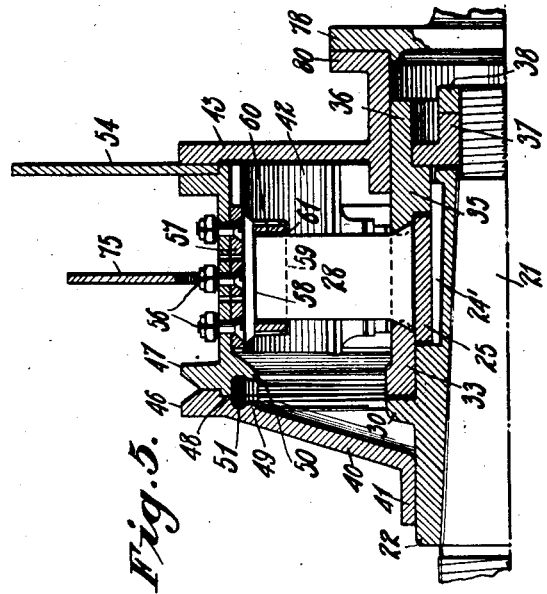
Figure 5 is a partial sectional view taken on the line 5—5 of Figure 3.
Figure 9:
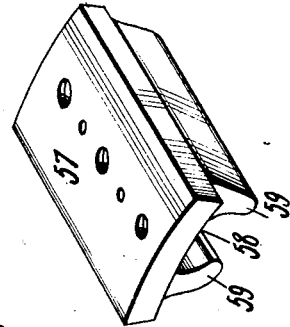

Referring to the drawings, and more particularly to Figure 1, 10 denotes the fusilage of an aeroplane having the usual pilots cock-pit 11, and an observers cock-pit 12. Wings 13 and 14 are provided and a voluble body or propeller as shown at 15 by way of illustrating one of the applications of the invention attached at one end of a dynamometer 16, as will be more fully hereinafter described. The dynamometer 16 is mounted on a revolving member or crank shaft 17 of an aeroplane motor (not shown) and the crank shaft 17, dynamometer 16 and propeller 15 are adapted to rotate as a unit. Within the observers cock-pit 12 is rigidly secured a motion picture camera 18, provided with an objective lens 19, communicating with one end of a periscope 20. The periscope 20 contains suitable reflecting mechanism (not shown) and the other end thereof communicates with the dynamometer 16, whereby an observer in the cock-pit 12 is enabled to obtain a film record of the movements of the dynamometer 16, and determine a resultant measurement in torque and thrust, of the machine to be tested.

Figure 4:
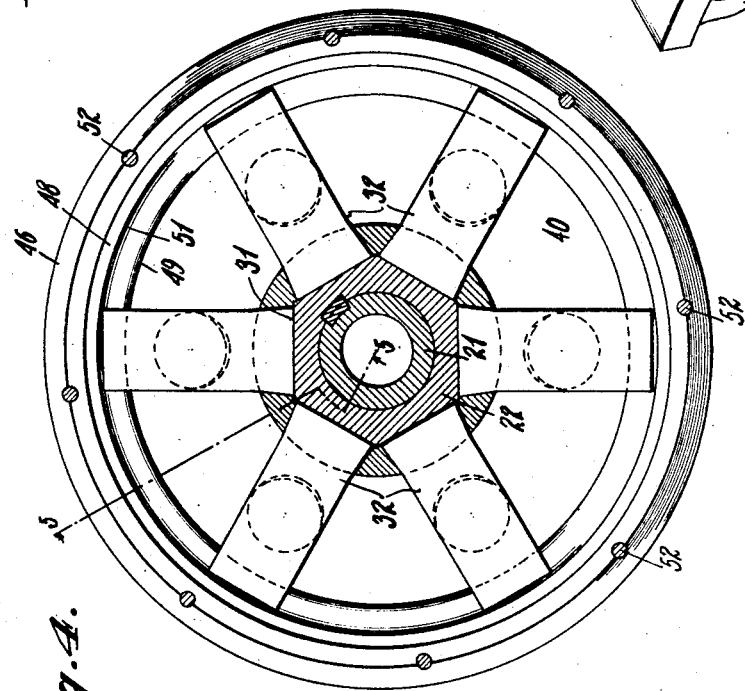
Figure 4 is a vertical sectional view on the line 4—4 of Figure 2.

Referring now to Figures 2, 3 and 4, the crank-shaft 17, having a tapered portion 21 is adapted to receive a sleeve 22, keyed to the crank-shaft 17 at 23. The sleeve 22 is provided with an annular reduced portion 24 upon which is keyed a second sleeve 25 by key 24' provided with slots 26 and 27, adapted to secure the inner ends of leaf springs units 28 and guide posts 29 respectively. The sleeve 22 is provided with an annular shoulder 30, having adjacent thereto a recess 31, preferably in the form of a hexagon, the sides of which are adapted to form seats for the inner ends of leaf spring units 32. As shown in the drawings the leaf spring units 28 and 32 are arranged at right angles to each other so that the leaf spring units 28 are subjected to the torque and the leaf spring units 32 to the thrust of the machine to be tested, the action thereof being more clearly understood as this description progresses.

An annular ring, designated at 33, surrounds the sleeve 22, having recessed portions 33'' engaging the leaf spring units 32. The other face of the ring 33 is beveled at 33' and bears against the beveled ends 34 of the leaf spring units 28, and the beveled portions 29' of the guide posts 29. An annular locking ring 35, mounted on the sleeve 22 at the right thereof as shown in Figure 2, and having a beveled face 35' which bears against beveled portions 34' of the leaf spring units 28, and the beveled portions 29'' of the guide posts 29, is provided with a reduced cup shaped portion 36 adapted to receive a washer 38 and locking nut 37 having screw-threaded engagement with the shaft 17 and bearing against the cup-shaped portion 36, whereby the leaf spring units 32, guide posts 29, ring 33, leaf spring units 28 and locking ring 35 are rigidly secured on the sleeve 22 and the shaft 17.

The mechanism thus far described is enclosed in a cylindrical casing, designated broadly at 39, Figure 2, comprising a cylinder head 40, shown at the left of Figure 2, mounted on the sleeve 22, and having an annular flange 41, a main cylinder 42, and a second cylinder head 43, shown at the right of Figure 2, which is mounted on the annular locking ring 35. The casing 39 may be secured from longitudinal movement on the sleeve 22 by means of set screws 44 having screw threaded engagement with the sleeve 22, the set screws 44, passing through slots 45 in the flange 41. The provision of the slots 45 will permit a relative rotation of the casing 39 with respect to the sleeve 22 and shaft 17, and by removing the set screws 44 the casing 39 may rotate relatively and move longitudinally with respect to the sleeve 22, and the shaft 17. These two operations will be hereinafter more clearly described.

The cylinder head 40 and the main cylinder 42 are provided with annular flanges 46 and 47 respectively having a lock-joint 48. The inner walls of the cylinder head 40 and main cylinder 42, have annular extensions 49 and 50 respectively which form a channel 51 to receive the outer ends of leaf spring units 32. The cylinder head 40 is secured to the main casing 42 by a plurality of lock bolts 52 which pass through suitable registering openings in the flanges 46 and 47. The main cylinder 42 is provided with a flange 53, at the right thereof, against which is secured a thrust disc 54, by lock-bolts 55 which pass through suitable openings in the flange 53, thrust disc 54 and cylinder head 43.

Referring now to Figure 3, it will be noted that the inner circumference of the main casing 42 is provided with a plurality of axially disposed projections 42' arranged in pairs in which are secured by bolts 56, bearing guide members 57. The bearing guide members 57 are provided with guide channels 58, formed by arcuate shaped longitudinal extensions 59. Within the guide channels 58 are arranged a plurality of bearing blocks 60, the outer longitudinal faces of which are also of arcuate shape, whereby the bearing blocks 60 may oscillate and slide in the guide channels 58. The bearing blocks 60 are provided with longitudinally disposed slots 61 adapted to receive the outer ends of the leaf spring units 28. The guide posts 29 are provided at the outer ends thereof with extensions 62, forming rectangular channels 63, which receive the rectangular heads 64 of T-bolts 65. The heads 64 of T-bolts 65 are adapted to slide in the channels 63. The T-bolts 65 are provided with shanks 66 which pass through openings 67 in guide blocks 68 disposed within tangential slots 69, arranged at suitable intervals in the main casing 42.

The T-bolts 65 are provided with shoulders 70 which extend above the main casing 42 and on which are secured, by lock nuts 71, having screw threaded engagement with the outer ends of shanks 66, brackets 72, provided with suitable openings to receive the shanks 66. The brackets 72 are provided with upwardly projecting bifurcated ears 73 and 74 between which is secured a torque disc 75, by bolts 76 passing through suitable registering openings in the ears 73 and 74 and the torque disc 75.

If the dynamometer is to be used to measure the torque and thrust of an aeroplane propeller, as shown in Figure 1, the propeller 15 is keyed at 76 to a detachable hub 77 provided with a flange 78 secured by bolts 79 to an upwardly extending flange 80 on a hub 81 of the cylinder head 43. The aeroplane engine is then started and motion is transmitted to the shaft 17, through the lock nut 37, sleeve 22 and casing 39 to the propeller 15, the operator first removing the set screws 44. The propeller in revolving exerts a thrust or force longitudinally with respect to the shaft 17, the direction of the force depending on the direction of rotation of the propeller 15, and also a torque or force extending in a line at an angle to the line of the propeller shaft 17 and since the casing 39 is free to rotate relatively with respect to the sleeve 22 and move longitudinally with respect to the line of the shaft 17, by the removal of the set screws 44, and since the casing is secured to the revolving propeller, the two forces above mentioned resolve into movements of the casing 39 in the above mentioned directions, against the tension of the leaf spring units 28 and 32. The thrust of the propeller 15, say in a forward direction is sufficient to overcome, to a degree depending on the speed at which the propeller is revolving, the tension of the leaf springs 32, the inner ends of which are rigidly secured to the sleeve 22, which is also rigidly secured to the shaft 17. Movement is imparted to the leaf springs 32 by the thrust of the propeller 15, which movement is transmitted by the leaf springs 32 to the casing 39, by the outer ends of the leaf springs 32 secured in the channel 51. The casing 39 is thereby caused to move along the sleeve 22 and locking ring 35, carrying therewith the thrust disc 54 the movement thereof being photographed by the observer in the cock-pit 12. At the same time the revolving propeller 15 is exerting a torque or twist against the tension of leaf springs 28, which are also rigidly secured at their inner ends to the sleeve 22, as previously described. The torque of the propeller 15 imparts motion to the leaf spring units 28 which leaf spring units 28 being connected at their outer ends in the bearing blocks 60, secured in the guide channels 58 of the bearing guide members 57 transmit a relative rotation of the casing 39 with respect to the shaft 17. The relative rotation of casing 39 is transmitted by the helical slots 69 and the guide blocks 68 to the T-bolts 65 which are adapted to slide in the guide post channels 63 of the guide posts 29. The relative rotation of the casing 39 is therefore converted into an axial movement with respect to the casing 39, upon the torque disc 75 carried by the brackets 72 mounted on the T-bolts 65, and this movement is also photographed by the observer in the cock-pit 12, by means of the periscope 20 and motion picture camera 18.

In order to measure the torque alone it is only necessary to insert the set screws 44, thus permitting the casing 39 to only move relatively with respect to the sleeve 22, by means of the slots 45 in the flange 41. It is obvious that when the set screws 44 are removed that a reading of the thrust disc 54 can be taken independently. It will also be noted that the provision of slidable and oscillating bearing blocks 60 for the leaf springs 28 and slidable T-bolts 65 in the channels 63 of the guide posts 29, comprise a novel means for permitting the casing 39 to move in two directions without disturbing the elements within the casing which are subjected to or acted upon by the forces of the body or member which is being tested.

Referring now to the Figure 12, I have shown another method and apparatus for measuring the torque and thrust of shafts in motion. This apparatus is particularly desirable in testing machines on the ground, and is also applicable to ships, propellers or other revolving bodies subjected to the forces of thrust and torque. The apparatus comprises a support 82, which may be attached to a wall or otherwise secured, having mounted thereon graduated glass tubes 83 and 84 closed at the upper ends with a cap having a small vent for air escape and open at the lower ends thereof. The lower open ends of the tubes 83 and 84 are connected to flexible piping 85 and 86 which is connected to one end of cylinders 87 and 88. The cylinders 87 and 88 contain pistons 89 and 90, provided with stems 91 and 92 which project through the other ends of the cylinders 87 and 88 and are connected by suitable couplings 93 and 94 to one end of rods 95 and 96 slidably mounted in brackets 97 and 98 mounted in the plane of dynamometer 16 secured on shaft 17 and supporting the propeller 15 as previously described. Bifurcated blocks designated at 99 and 100 are rigidly mounted on the other ends of rods 95 and 96 and are provided with adjustable diametrically disposed contacts 101 and 102, spaced apart to make contact with thrust disc 54 and torque disc 75 respectively in the bifurcations of the blocks 99 and 100. The graduated tubes 83 and 84, the flexible piping 85 and 86, and cylinders 87 and 88 contain a suitable liquid as indicated on the drawing. The operation of the dynamometer having been previously described it is obvious that movements of the torque disc 75 and thrust disc 54 will be transmitted to the contacts 101 and 102, thence through the bifurcated blocks 99 and 100, rods 95 and 96, couplings 93 and 94, stems 91 and 92 to the pistons 89 and 90. Movement of the pistons 89 and 90 in the cylinders 87 and 88 causes the liquid to rise or fall in the graduated tubes 83 and 84 according to the direction of movement of the torque disc 75 and thrust disc 54, whereby readings in thrust and torque may be taken from the graduations on the tubes 83 and 84 respectively.

The foregoing description and the drawings have reference to what may be considered preferred embodiments of my invention. It is to be understood that I may make such changes in construction and arrangement and combinations of parts as may prove expedient and fall within the scope of the appended claims.

Having thus fully described my invention, what I claim as new and desire to secure by Letters Patent is:

1. In a transmitting dynamometer, in combination, a member capable of a plurality of movements, means for indicating said movements, said means including movable discs rotatable with said dynamometer and capable of longitudinal displacement and restraining members associated with said last named parts for transmitting the torque and thrust of said plurality of movements, each of said movements being an independent function of the dynamometer.

2. In a transmitting dynamometer, in combination, a revoluble member having flanges, the movement of which is adapted to indicate thrust in either direction, a disc secured between said flanges for indicating thrust of said revoluble member and capable of longitudinal movement also flat springs associated with said member, the movement of said members being a product of the actuating flat springs so disposed and secured as to produce said longitudinal and transverse movement thereby indicating the measurable force and means adapted to independently record such movement.

3. In a transmitting dynamometer, in combination, a revoluble member and a plurality of super-imposed members associated therewith, yieldable means connecting the aforesaid members, said first mentioned members together adapted to indicate a plurality of forces independently, one in a transverse or circumferential direction due to torque and the other in a lateral direction due to thrust whereby said attached super-imposed members will, by their displacement, indicate the volume of forces acting thereon.

4. In a transmitting dynamometer, in combination, a revoluble member adapted to be directly attached to a driving unit, a second member mounted on said first member and capable of relative longitudinal and transverse movement and rotatably disposed flat springs associated with said parts and securely locked to and forming a part of said first member.

5. In a transmitting dynamometer, in combination, a fixed part, a yielding revoluble member adapted to indicate torque and thrust independently one from the other or in unison, and flat springs associated with said revoluble member, capable of yielding to a transverse or longitudinal movement.

6. In a transmitting dynamometer, in combination, a revoluble member adapted to indicate a plurality of forces in different directions, a driving member for said revoluble member, a driven member and flat springs interposed therebetween and loosely connected whereby both lateral and relative longitudinal movement may be obtained.

7. In a transmitting dynamometer, in combination, a driving member, a driven member, flat springs interposed between said parts directly connected to driving member and loosely connected to driven member whereby relative and transverse longitudinal movement is permitted for indicating torque and thrust, said springs being yieldable to permit of said indications.

8. A mechanical combination of units so arranged as to permit of forced rotation as a whole and transmit a plurality of combined forces while actually rotating a restraining means, a bearing, the said restraining means being a plurality of radially disposed flat springs fixed to the first member (driving) in such a manner as to be renewable at will for replacement as may be required.

9. In an apparatus of the character described, in combination, a revoluble body, means adapted to indicate a plurality of forces, a revoluble member adapted to be connected with said body, a pair of members mounted upon said member and connected therewith and means whereby the forces exerted by said revoluble body are converted into reciprocatory movement of the members mounted thereon.

10. In an apparatus of the character described, in combination, a revoluble body adapted to exert a plurality of forces to be measured by said apparatus, a revoluble member adapted to be connected with said body, a pair of members mounted upon said member and connected therewith and means whereby the forces exerted by said revoluble body are converted into reciprocatory movement of the members mounted thereon, and means actuated by movement of said last mentioned members for indicating the forces exerted by said revoluble body.

11. In an apparatus of the character described, in combination, with a revoluble body adapted to exert a plurality of forces to be measured by said apparatus, a shaft adapted to be connected therewith, a pair of discs mounted on the shaft and flexibly connected therewith, means associated with one of said discs adapted to convert one of said forces into a movement of reciprocation and means associated with said disc for indicating the extent of such movement thereon.

12. In an apparatus of the character described, in combination with a revoluble body adapted to exert a plurality of forces to be measured by said apparatus, a shaft adapted to be connected with said revoluble body, a member mounted on said body adapted to have relative rotation with respect thereto, a second member mounted on said body adapted to have relative longitudinal movement with respect thereto, means for converting said movement in reciprocatory movement and means for indicating the extent of movement of both of said members due to the independent forces exerted.

13. In an apparatus of the character described, in combination with a revoluble body, a shaft adapted to be connected with said revoluble body, a member mounted on said body adapted to have revoluble rotation with respect thereto, a second member, mounted on said body adapted to have relative longitudinal movement with respect thereto, means for converting said movement into reciprocatory movement and means for indicating the extent of movement of both said members due to the indepedent forces exerted and means for recording the indicated extents of movement.

14. In an apparatus of the character described, in combination with a revoluble body adapted to exert a plurality of forces, a shaft connected with said revoluble body whereby said shaft and said revoluble body rotate in unison, a casing mounted on said shaft capable of relative rotary movement and movement in the axial line with respect to said shaft, flexible connections between said member and said shaft, discs associated with said casing, and means for converting the relative rotary movement into one of longitudinal movement and means for indicating the extent of such movement.

15. In an apparatus for transmitting torque and thrust of revoluble bodies in combination, a revoluble member to which the revoluble body is adapted to be connected and means mounted on said revoluble member adapted to indicate the torque and thrust of said revoluble body, said means including a member mounted on and a part of said revoluble member and means associated therewith for converting rotary movement into reciprocative movement and means for visibly indicating the extent of said last movement.

16. In an apparatus of the character described, in combination, a revoluble body, the torque and thrust of which is adapted to be measured, a revoluble member adapted to be connected with said body, a pair of members mounted upon said members and connected therewith and means whereby the torque and thrust of said revoluble member is converted into reciprocatory movement of the members mounted thereon.

17. In an apparatus of the character described, in combination, a revoluble body, the torque and thrust of which is adapted to be measured, a revoluble member adapted to be connected with said body, a pair of members mounted upon said member and connected therewith and means whereby the torque and thrust of said revoluble member is converted into reciprocatory movement of the members mounted thereon, and means actuated by movement of said last mentioned members for indicating the torque and thrust of the revoluble body.

18. In an apparatus of the character described in combination with a revoluble body the torque and thrust of which is adapted to be measured by said apparatus, a shaft adapted to be connected therewith, a pair of discs mounted on the shaft and flexibly connected therewith, means associated with one of said discs adapted to convert the torque or revoluble movement into a movement of reciprocation and means associated with said discs for indicating the extent of such movement thereon.

19. In an apparatus of the character described in combination with a revoluble body, the torque and thrust of which is adapted to be measured on said apparatus, a shaft adapted to be connected with said revoluble body, a member mounted on said body adapted to have relative rotation with respect thereto, a second member mounted on said body adapted to have relative longitudinal movement with respect thereto, means for converting said movement into reciprocatory movement and means for indicating the extent of movement of both of said members due to the independent thrust and torque.

20. In an apparatus of the character described in combination with a revoluble body, the torque and thrust of which is adapted to be measured on said apparatus, a shaft adapted to be connected with said revoluble body, a member mounted on said body adapted to have relative rotation with respect thereto, a second member mounted on said body adapted to have relative longitudinal movement with respect thereto, means for converting said movement into reciprocatory movement and means for indicating the extent of movement of both of said members due to the independent thrust and torque and means for recording the indicated extent of movement.

21. In an apparatus of the character described in combination with a body, the torque and thrust of which is adapted to be measured by said apparatus, a shaft connected with said revoluble body whereby they rotate in unison, a casing mounted on said shaft capable of relative rotary movement and movement in the axial line of said shaft, flexible connection imposed between said member and said shaft, discs associated with said casing, means for converting the relative rotary movement into one of longitudinal movement and means for indicating the extent of such movement.

22. In combination, a driving member, a driven member, disposed in axial alignment and capable of relative movement in the direction of the axes of said members and yielding means comprising a plurality of radially disposed flat springs interposed between the driving and driven member.

23. In combination, a driving member, a driven member, disposed in axial alignment and capable of relative movement in the direction of the axes of said members and yielding means comprising a plurality of radially disposed springs interposed between the driving member and driven member, each of said springs comprising a plurality of relatively flat yieldable metallic members.

Signed at Washington, District of Columbia, this 2nd day of March, 1920.

W. N. EATON.